United States Patent [19]
Chang

[11] Patent Number: 5,748,708
[45] Date of Patent: May 5, 1998

[54] VOICE-GENERATING TELEPHONE SET WITHOUT EXTERNAL POWER SUPPLY

[75] Inventor: Herman Chang, Hsinchu, Taiwan

[73] Assignee: Holtek Microelectronics, Inc., Hsinchu, Taiwan

[21] Appl. No.: 529,922

[22] Filed: Sep. 18, 1995

[51] Int. Cl.$^6$ .................. H04M 1/56; H04M 1/272
[52] U.S. Cl. .................. 379/67; 379/352; 379/359
[58] Field of Search .................. 379/52, 67, 88, 379/352, 353, 354, 355, 356, 359, 361, 362, 368

[56] References Cited

U.S. PATENT DOCUMENTS

| | | | |
|---|---|---|---|
| 3,430,004 | 2/1969 | Shenk | 379/354 |
| 4,578,540 | 3/1986 | Borg et al. | 379/200 |
| 5,131,029 | 7/1992 | Kunstadt | 379/355 |
| 5,200,995 | 4/1993 | Gaukel et al. | 379/200 |
| 5,311,175 | 5/1994 | Waldman | 379/355 |
| 5,557,671 | 9/1996 | Endoh | 379/52 |

FOREIGN PATENT DOCUMENTS 2124854  2/1984  United Kingdom .

*Primary Examiner*—Krista Zele
*Assistant Examiner*—Daniel S. Hunter
*Attorney, Agent, or Firm*—W. Wayne Liauh

[57] ABSTRACT

A voice-dialing device without additional power supply can generate articulate voice signal upon dialing; such device can provide a function of voice dialing, and a function of confirming the dialing. In dialing operation, the device can provide a correct dialing by using the voice dialing as an auxiliary means; after dialing, a user can confirm the number dialed so as to ensure a user to control the dialing operation and the correctness of a number dialed.

1 Claim, 3 Drawing Sheets

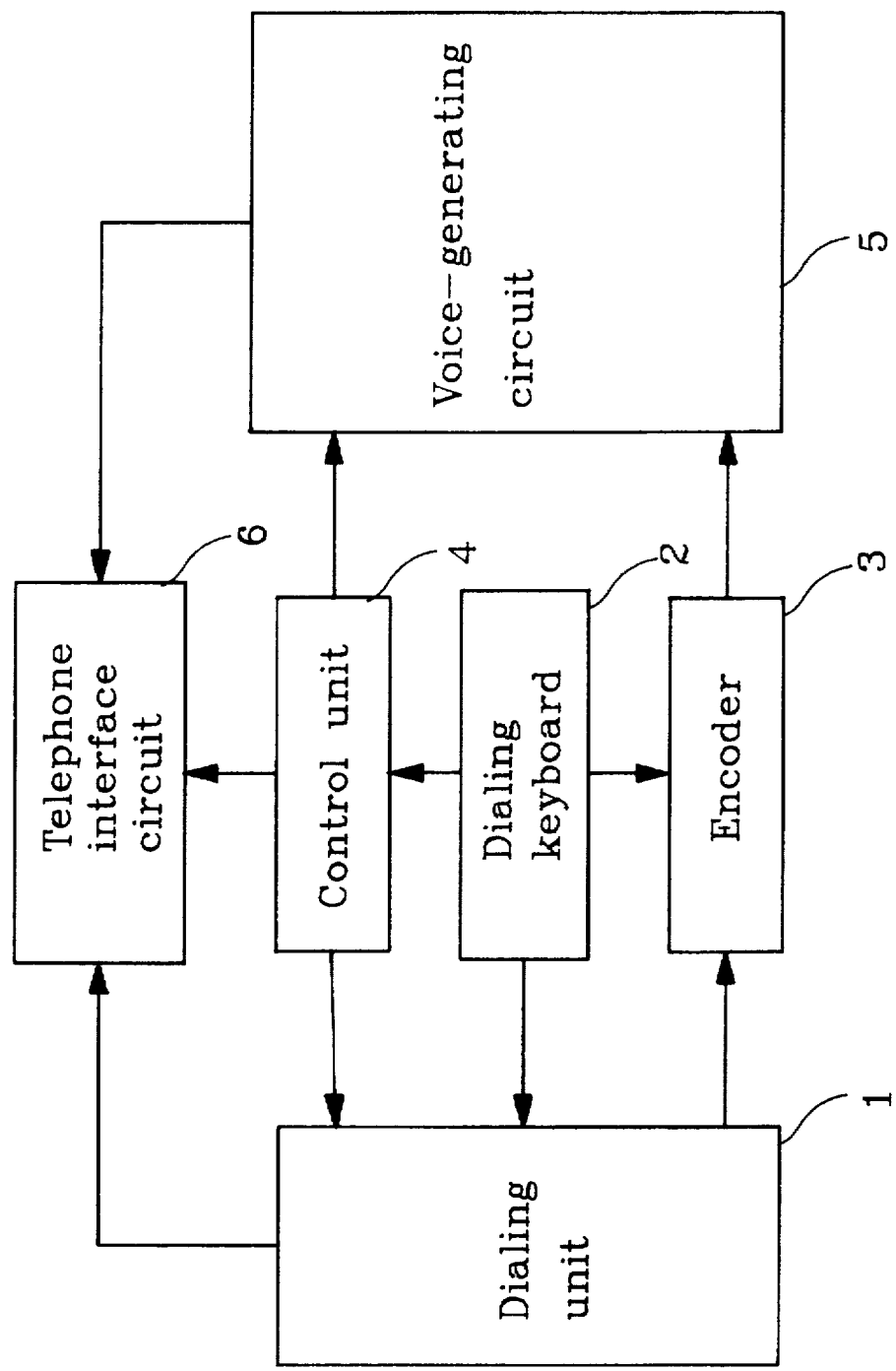
F I G. 1

FIG. 2

| CLR | P | PAGE | SND | M1 | M6 | M11 | M16 |
| --- | --- | --- | --- | --- | --- | --- | --- |
| 1 | 2 | 3 | F | M2 | M7 | M12 | M17 |
| 4 | 5 | 6 | A | M3 | M8 | M13 | M18 |
| 7 | 8 | 9 | ST | M4 | M9 | M14 | M19 |
| * | 0 | # | R | M5 | M10 | M15 | M20 |

5,748,708

VOICE-GENERATING TELEPHONE SET WITHOUT EXTERNAL POWER SUPPLY

BACKGROUND OF THE INVENTION

The conventional telephone set usually is a dial disk type or a multi-frequency type to provide a dialing operation to send out a signal; however, none of the conventional telephone sets has a voice functions. Such conventional telephone set will be rather difficult to use during night time or on a spot where the visibility is poor; such inconvenience is particularly true to the blind; therefore, the practicality of such telephone set is reduced considerably.

In the conventional telephone set (either the dial disk type or the analog type), a voice device may be installed therein, but some draw backs will exist therein as follows:

1. An additional battery must be provided as a power supply in the voice circuit for dialing operation so as to generate an articulate voice signal with the voice-generating circuit.
2. The keying dialing is used for generating intermittent signals by means of a series of intermittent times; such signals will be sent to a central office to fulfill the dialing operation.

Furthermore, if a key on a conventional telephone set is pushed down, the dial thereof will send out a pulse signal upon a key marked with *3* three pulses will be sent out; if a key marked with *2* two pulses will be sent out. When a key is pushed down, there will be a pulse signal and a voice signal to be sent out simultaneously; in that case, the current loop formed between the telephone set and the central office will have an intermittent condition, which would affect the result of the voice signal output, i.e., there will be not current loop during the intermittent instant of the pulse signal; in other words, there is no current available, and therefore the quality of the voice signal will be poor as a result of the intermittent condition of the current loop; it is deemed a drawback of the prior art. To overcome the aforesaid drawback, an additional power supply must be provided, and it is a method not complying with the principle of efficiency.

According to a conventional telephone set, as soon as a user picks up a handset thereof, the hook switch will function to establish a According to a conventional telephone set, as soon as a user picks up a handset thereof, the hook switch will function to establish a current loop between the telephone set with the central office; then, a signal generated by pushing a key will be sent to the central office. After dialing, a user will be unable to know whether the dialed number is correct or not, and the number has been sent out already; such condition is particularly true and inconvenient to the blind. When a wrong number has been dialed and discovered, a user has to re-dial the correct number; therefore, the conventional dialing method has to be improved.

SUMMARY OF THE INVENTION

The feature of the present invention is to enable a telephone set to be dialed without requiring an additional power supply, and to generate an articulate voice signal so as to overcome the existing drawback of a conventional telephone set.

Another object of the present invention is to provide a dialing device, which can provide a voice function, and can confirm a correct number dialed. During dialing, a voice can be used to make sure that a correct number can be dialed; after dialing, a user confirm the number dialed; in other words, a user can surely control the dialing operation and know whether the dialing is correct or not. The present invention is particularly practical to the blind or to a user under circumstances having poor visibility.

BRIEF DESCRIPTION OF THE DRAWINGS

FIG. 1 is a block diagram of the circuit according to the present invention.

FIG. 2 is an embodiment of configuration of the dialing key according to the present invention.

DETAILED DESCRIPTION

Figure 3:
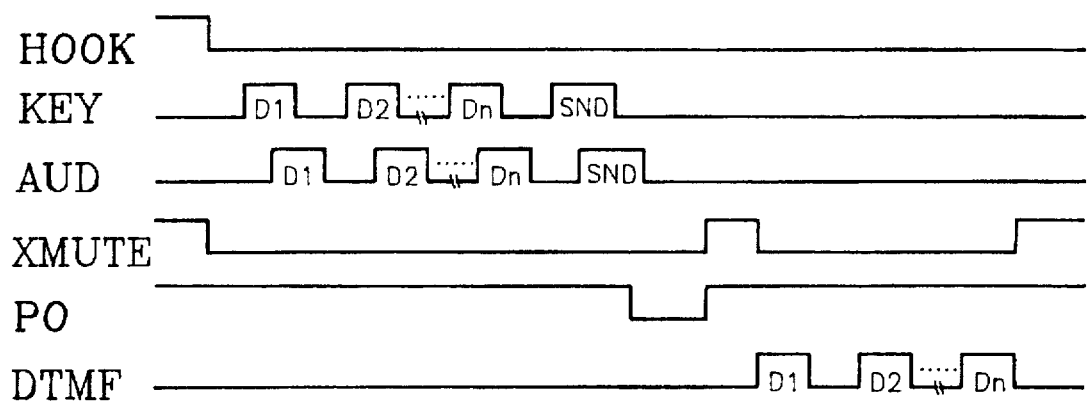
FIG. 3 is a time sequence diagram upon dialing manually according to the present invention.

As shown in FIG. 1, the circuit according to the present invention comprises:

A dialing unit 1, which is used for reception of keying signal from a dialing keyboard 2, and sending out a pulse signal or a DTMF (dual-tone multi-frequency) signal. The dialing unit includes a memory for a memory dialing; the IC of the dialing unit includes a XMUTE terminal, a PO terminal, a CTMF terminal. The IC also includes a means to drive a LCD.

A dialing keyboard 2, which includes a plurality of keys (such as 1,2,3,$M_1$, $M_2$, $M_3$, CLR, SND . . . etc.) According to the embodiment of the present invention, the configuration of the keys is shown in FIG. 2, in which SND is a sending key; after a dialing, a user should push this key to confirm the dialing being correct so as to have the number dialed transmitted to a central office.

An encoder 3, which is connected with the dialing keyboard 2, and is used for reception of signals from the dialing unit 1 and the dialing keyboard 2. Each key of the dialing keyboard 2 is encoded in six bits, such as the key-1 being indicated with six bits, such as the key-1 being indicated with *00001* and the key-2 being indicated with *00010*

A control unit 4, which is used to trigger a voice-generating circuit 5, and to control the output of the dialing unit 1 whether the signal thereof is put on line or not. The keying signal of the dialing keyboard 2 can also pass through the control unit 4 to trigger the voice-generating circuit 5; therefore, a user can also hear a corresponding voice of pressing the key during dialing.

A voice-generating circuit 5, which is used for reception of a triggering signal of the control unit 4, and for sending out a voice signal corresponding to the encoded signal of the encoder 3.

A telephone interface circuit 6, which is connected with the output terminals of the dialing unit 1 and the voice-generating circuit 5 respectively; the function of such circuit is used as all interface of the central office line or a voice generator (such as a loudspeaker). Such circuit can receive the control signal of the control unit 4 so as to determine whether the signal from the dialing unit 1 should be sent out or the voice signal of the voice-generating circuit 5 should be sent out.

By means of the aforesaid circuit structure, any key on the dialing keyboard 2 will, upon being pushed down, generate a keying signal, which call trigger the dialing unit 1, and store a data in the dialing unit 1 which can send out the telephone signal if necessary; also, the key signal can pass through the control unit 4 to trigger the voice-generating circuit 5, which will, according to the six bits keying signal generated by the encoder 3, send out a voice corresponding to the keys pressed down; in other words, as soon as a user pushed down a key, he (or she) can hear a voice signal from the handset or the loudspeaker immediately.

Figure 4:
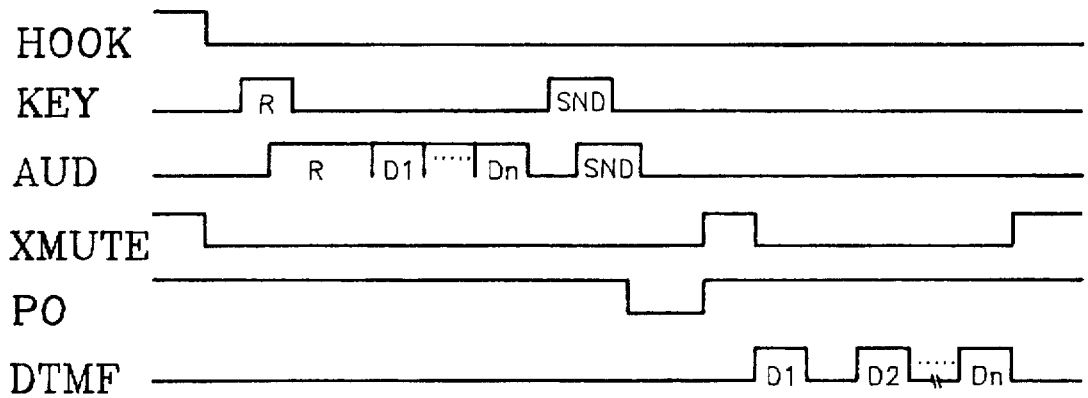
FIG. 4 is a time sequence diagram upon redialing according to the present invention.
Figure 5:
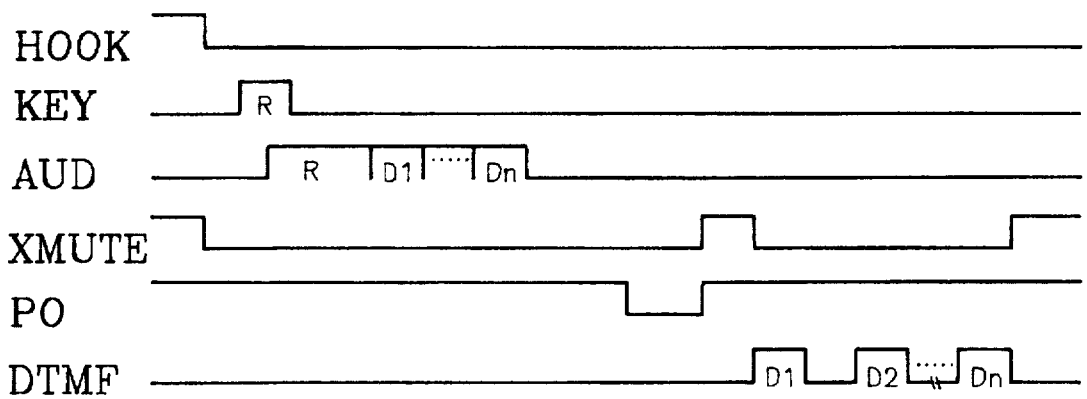
FIG. 5 is a time sequence diagram upon using memory dialing according to the present invention.

To describe the operation procedures and theory clearly, the present invention is further described in detail about the operation theory thereof with the accompanying time sequence diagrams in FIGS. 3 to 5.

FIG. 3 is a time sequence diagram as dialing manually according to the present invention, in which the function and definition of every signal are described as follows:

Hook represents a hook switch signal; if such signal is VDD ( i.e., in a high voltage), it indicates that the telephone is not in use; if such signal is VSS (i.e., in a low voltage), it indicates that the telephone is in use.

Key represents the keying signal of the dialing keyboard; if such signal is VDD, it indicates that a key has been pushed down; if such signal is VSS, it indicates that no key is pushed down.

AUD represents the output signal of the voice-generating circuit; if such output signal is VDD, it indicates that there is an output of voice signal; if such signal is VSS, it indicates that there is no output of voice signal.

XMUTE represents a signal on the pulse output terminal of the dialing unit 1; if such signal is VDD, it indicates that there is no silent effect; if such signal is VSS, it indicates that there is a silent effect.

PO represents a signal on the pulse output of the dialing unit 1; if such signal is VDD, it indicates that the telephone set and central office are formed into a current loop; if such signal is VSS, it indicates that a current loop is not formed between the telephone and the central office.

DTMF represents an output signal of DTMF (dual-tone Multi-frequency); if such signal is VDD, it indicates that there is an output signal of DTMF; if such signal is VSS, it indicates that there is no output signal of DTMF.

As shown in FIG. 3, as soon as the handset is picked up, and the PO signal is Vdd, it indicates that a current loop is formed; in that case, if a user pushes down a key on the dialing keyboard (i.e., a conventional dialer), then will generate a pulse signal or a DTMF signal output, of which the drawbacks have been mentioned above. Now, take the pulse output for instance; if a user pushes down a key marked with *3* there will be an output of three pulses; if a key marked with *2* is pushed down, there will be an output of two pulses; in other words, when a key is pushed down, an output of a pulse signal and a voice signal will take place simultaneously, and then the current loop formed previously will be interrupted intermittently. The intermittent state of the current loop would badly affect the output of the voice signal. Further, when the PO signal is VSS, there has been no current loop at all, i.e., no current is available; consequently, the quality of output of the voice signal will be very poor as a result of the intermittent state of the current loop.

Regarding the drawbacks of the conventional art as mentioned above, the dialing device according to present invention has provided a complete improvement. The manual dialing method of the present invention is that, during dialing, all the data of the dialing signals $(D_1, D_2 \ldots D_n)$ are to be stored in the dialing unit 1, which has no output of a pulse signal or a DTMF signal in that time; instead, only a voice signal generated in the voice-generating circuit 5 is sent out from the AUD terminal. By using the aforesaid method, no additional power supply is to be furnished, i.e., the current of the current loop can be used for generating voice, and it is deemed a feature of the present invention.

After dialing a number (i.e., the dialing unit 1 being stored with sequential keying signals $D_1$-$D_n$), if a user has confirmed the number dialed being correct, the user can only push the SND key; then, the dialing unit 1 will be cut off for a given period of time to prevent a handset from being unable to send out a dialing signal upon the user pick; up the handset for too long time to cause the dialing tone to become ended, i.e., the PO signal in the dialing unit 1 will reduce from a high level to a low level; after a given period of time, the PO signal will be restored from a low level to a high level so as to have the DTMF signal stored in the dial 1 sent out one after another. Such method of making sure by a user first before sending out a signal is also deemed another feature of the present invention.

FIG. 4 is a time sequence diagram upon redialing according to the present invention, in which all the nodes are the same as that shown in FIG. 3, and therefore the nodes are indicated with the same marks. When the handset is picked up, and the PO signal is VDD, it indicates that the dialing unit of the present invention has established a current loop with the central office. When the REDIAL on the dialing keyboard is pushed down, only the AUD terminal of the voice-generating circuit 5 sends out a corresponding voice signal; after the last signal is sent out, and a given period of time for a user to confirm, the dialing unit 1 will be cut off automatically for a given period of time, i.e., the PO signal of the dialing unit 1 will be reduced from a high voltage to a low voltage. After a given period of time, a telephone number will be sent out from the DTMF terminal of the dialing unit one after another.

FIG. 5 is a time sequence diagram upon using memory dialing of the present invention, in which all the nodes are the same as that shown in FIG. 3, i.e., being indicated with the same marks. As soon as the handset is picked up, and the PO signal is VDD, it indicates that the dialing unit 1 of the present invention has established a current loop with the central office. When one of the memory dialing keys Mi (I=1–20) on the dialing keyboard is pushed down, only the AUD terminal of the voice-generating circuit 5 can send out a voice signal. After the last signal is sent out, and a given period of time is over (for example, two seconds) for a user to confirm, the dialing unit 1 will be cut off automatically for given period of time; then, a telephone number stored will be sent out one after another.

According to the aforesaid description, it is apparent that the present invention can generate a voice, by means of the basic power supply (from 20–100 MA), upon a user pushing a key; the present invention can also store a telephone number, set by a user, in a memory, and such telephone number can be sent to a central office after a user confirming the same; in other words, when a user pushed a number key, a voice will be generated simultaneously, i.e., after a key being pushed down, a corresponding voice will be generated directly after the user confirms the number stored, such number will be sent to a central office with a SND key, and then the dialing and voice-transmitting operation will be done correctly and conveniently.

In real operation, a telephone number can also be sent out by manud mode; in that case, the SND key should be pushed down after a telephone number being dialed so as to have the telephone number the dialing operation transmitted to a central office; of course, the dialing operation may be done by automatical mode, i.e., after a telephone number is dialed, the number will be transmitted automatically without pushing the SND key. Regarding voice process, different language voices may be provided so as to meet requirements in different areas.

I claim:

1. A voice-generating telephone set, said voice-generating telephone set powered by telephone line power only, comprising:

a dialing unit containing means for receiving keying signals from a dialing keyboard, means for sending out a pulse signal or a DTMF (dual-tone multi-frequency) signal, and a memory means for storing at least a number that has been dialed from said dialing keyboard, an XMUTE signal, a PO signal, and a DTMF signal corresponding to said dialed number, wherein when said PO signal is high, said dialing unit will not send out said pulse signal or said DTMF signal, thus maintaining an electric current loop between said said telephone set and a telephone switchboard in an off-hook state;

said dialing keyboard including a plurality of keys and a keyboard circuitry such that, when one of said keys is pressed, said dialing unit is triggered to store in said memory means data corresponding to said key being pressed, and, at the same time, a control unit is triggered to generate and send a control signal to a voice-generating circuit;

an encoder for receiving output from said dialing unit and said dialing keyboard, and encoding a keying signal into a multiple-bit binary value, which is then transmitted to said voice-generating circuit;

said control unit comprising input means for receiving said keying signal from said dialing keyboard, and output means for triggering said voice-generating circuit to pronounce said multiple-bit binary value, said control unit further comprising means to send a PO signal to said dialing unit when a handset is lifted off hook, so as to maintain said PO signal at high such that said dialing unit will not send out said pulse signal or said DTMF signal, thus maintaining an electric current loop between said said telephone set and said telephone switchboard in said off-hook state;

a SND key in said dialing keyboard for, when it is being pressed, triggering said dialing unit to send one or more DTMF signals corresponding to said dialed number.

whereby when the handset is lifted from the hook, said control circuit send said PO signal to said dialing unit to hold off the sending of pulse or DTMF signals, thus allowing the telephone set to continue to receive electric current from the switchboard in an uninterrupted manner in said off-hook state; when said dialing keyboard is pressed, said dialing unit stores data corresponding to a pressed key, said control unit is triggered to generate and send a control signal to said voice-generating circuit to pronounce a multiple-bit word, which is obtained via an encoder based on the pressed key; finally, as SND key is pressed which interrupts said PO signal and causes said dialing unit to output the dialed number as desired pulse or DTMF signals.

* * * * *